(12) United States Patent
Fogal, Jr. et al.

(10) Patent No.: US 12,544,877 B2
(45) Date of Patent: Feb. 10, 2026

(54) METHOD OF CLEANING AN ALUMINUM WHEEL

(71) Applicant: INTERNATIONAL MARKETING, INC., Chambersburg, PA (US)

(72) Inventors: Robert D. Fogal, Jr., Shippensburg, PA (US); Christopher M. Rudyk, Waynesboro, PA (US); Stephen Dale Ludwig, Lancaster, PA (US)

(73) Assignee: INTERNATIONAL MARKETING, INC., Chambersburg, PA (US)

( * ) Notice: Subject to any disclaimer, the term of this patent is extended or adjusted under 35 U.S.C. 154(b) by 666 days.

(21) Appl. No.: 17/792,596

(22) PCT Filed: Jan. 14, 2021

(86) PCT No.: PCT/US2021/013476
§ 371 (c)(1),
(2) Date: Jul. 13, 2022

(87) PCT Pub. No.: WO2021/146453
PCT Pub. Date: Jul. 22, 2021

(65) Prior Publication Data
US 2023/0063129 A1 Mar. 2, 2023

Related U.S. Application Data

(60) Provisional application No. 63/073,864, filed on Sep. 2, 2020, provisional application No. 62/960,940, filed on Jan. 14, 2020.

(51) Int. Cl.
*B24C 1/08* (2006.01)
*B08B 3/02* (2006.01)
(Continued)

(52) U.S. Cl.
CPC .............. *B24C 1/08* (2013.01); *B08B 3/02* (2013.01); *B08B 7/02* (2013.01); *B08B 7/04* (2013.01);
(Continued)

(58) Field of Classification Search
CPC .. B08B 3/044; B08B 3/12; B08B 7/02; B08B 7/04; B60S 3/042; B60S 3/048;
(Continued)

(56) References Cited

U.S. PATENT DOCUMENTS 3,475,936 A * 11/1969 Steele ...................... B24C 3/12
451/38
3,482,423 A 12/1969 Murray et al.
(Continued)

FOREIGN PATENT DOCUMENTS

CN 103866242 A 6/2014
CN 105386051 A 3/2016
(Continued)

OTHER PUBLICATIONS

International Search Report and Written Opinion Dated Feb. 26, 2021.
(Continued)

*Primary Examiner* — Makena S Markman
(74) *Attorney, Agent, or Firm* — Hahn Loeser & Parks LLP; Daniel J. Smola (57) ABSTRACT

The present application includes methods, apparatuses, and systems for cleaning an aluminum wheel. In particular instances, a method of treating an exterior surface of an aluminum vehicle wheel comprising: blasting the exterior surface a first occurrence for a first duration at a first velocity using blasting media; blasting the exterior surface a second occurrence for a second duration at a second velocity using blasting media after blasting the exterior surface for a first (Continued)

duration, the second velocity being substantially lower than the first velocity; and, arranging the vehicle wheel in contact with vibratory finishing media and vibrating the vehicle wheel with the vibratory finishing media for a duration after blasting the exterior surface in each of the first and second occurrences.

22 Claims, 7 Drawing Sheets

(51) Int. Cl.
| | |
|---|---|
| *B08B 7/02* | (2006.01) |
| *B08B 7/04* | (2006.01) |
| *B24B 29/04* | (2006.01) |
| *B24B 31/06* | (2006.01) |
| *B24C 3/32* | (2006.01) |
| *B24C 11/00* | (2006.01) |
| *B60S 3/04* | (2006.01) |
| *C23G 1/12* | (2006.01) |
| *C25D 11/16* | (2006.01) |

(52) U.S. Cl.
CPC .............. *B24B 29/04* (2013.01); *B24B 31/06* (2013.01); *B24C 3/32* (2013.01); *B24C 11/00* (2013.01); *C23G 1/125* (2013.01); *C25D 11/16* (2013.01); *B60S 3/042* (2013.01)

(58) Field of Classification Search
CPC ....... B24B 19/26; B24B 31/06; B24B 31/064; B24B 31/003; B24B 5/44; B24B 55/02; B24B 1/04; B24B 27/0076; B24B 27/0023; B24C 1/10; B24C 1/086; B24C 3/04; B24C 3/085; B24C 3/18; B24C 3/24; B24C 3/22; B24C 3/12; B24C 3/088; B24C 3/14; B24C 5/005; B24C 11/00; B24C 11/005
USPC .... 451/38, 86, 97, 98, 113, 104, 89, 34, 37; 72/53; 29/90.7; 134/123
See application file for complete search history.

(56) References Cited

U.S. PATENT DOCUMENTS

| | | | |
|---|---|---|---|
| 4,001,976 A | | 1/1977 | MacMillan |
| 4,018,006 A | * | 4/1977 | Moelders ................ B24C 3/088 451/82 |
| 4,723,377 A | | 2/1988 | Watts |
| 5,226,971 A | | 7/1993 | Fogal et al. |
| 5,384,990 A | | 1/1995 | Spears, Jr. et al. |
| 5,409,415 A | * | 4/1995 | Kawanami ............. B24C 11/00 451/39 |
| 5,491,030 A | * | 2/1996 | Asai ........................ B24B 1/002 428/458 |
| 5,512,008 A | | 4/1996 | Musschoot |
| 5,981,084 A | | 11/1999 | Riabkov et al. |
| 6,171,175 B1 | | 1/2001 | Shaikh et al. |
| 8,533,954 B2 | * | 9/2013 | Tange ...................... C21D 7/06 29/896.9 |
| 10,166,651 B2 | * | 1/2019 | Tian ........................ B24B 37/20 |
| 2002/0002990 A1 | | 1/2002 | Wohlgemuth |
| 2002/0155975 A1 | | 10/2002 | Hokkirigawa et al. |
| 2003/0040266 A1 | | 2/2003 | Pepin et al. |
| 2011/0130075 A1 | | 6/2011 | Voges et al. |
| 2012/0304450 A1 | | 12/2012 | Schrubke et al. |

FOREIGN PATENT DOCUMENTS

| | | |
|---|---|---|
| CN | 207642944 U | 7/2018 |
| CN | 109277950 A | 1/2019 |
| CN | 208483728 U | 2/2019 |
| CN | 104101026 A | 10/2021 |
| DE | 9209854 U1 | 9/1992 |
| DE | 102011015284 A1 | 10/2012 |
| KR | 101589115 B1 | 1/2016 |

OTHER PUBLICATIONS

Guidelines for Ultrasonic Cleaning Solution Selection—Tovatech LLC, Sep. 28, 2019.
Ultrasonic Cleaning Systems for Precision Optics—Tovatech LLC, Aug. 12, 2022.

* cited by examiner

METHOD OF CLEANING AN ALUMINUM WHEEL

CROSS-REFERENCE TO RELATED APPLICATIONS

This application claims priority to, and the benefit of, both U.S. provisional patent application No. 62/960,940, filed Jan. 14, 2020 with the U.S. Patent Office, and U.S. provisional patent application No. 63/073,864, filed Sep. 2, 2020 with the U.S. Patent Office, each being incorporated herein by reference.

BACKGROUND

Field

This application relates generally to aluminum wheels and, more specifically, to a method of cleaning an aluminum wheel by washing then blasting the aluminum wheel with blasting media and subsequently by vibratory finishing, and apparatus and systems for implementing or carrying out such methods.

Description of the Related Art

Merely washing the aluminum wheel will not remove brake dust, rubber, tar, concrete, or asphalt, that may accumulate on the wheel during use. Moreover, aluminum is soft as compared to steel. Current aluminum wheel refinishing systems, such as for the automotive and trucking industries, remove debris and other foreign matter from the wheel through an abrasive sanding process, which often results in also removing aluminum from the wheel. Subsequently, the aluminum wheel is polished using various buffing wheels with a polishing compound. After having been refinished on multiple occasions, the wheel will lose enough metal that it should be removed from service. Otherwise, using such techniques, the aluminum wheel is not sufficiently cleaned without removing aluminum from the wheel. Accordingly, a more effective method is needed for cleaning aluminum vehicle wheels.

SUMMARY

This disclosure provides methods for treating an exterior surface of an aluminum vehicle wheel, as well as apparatuses or devices for performing portions of such methods and systems for performing such methods, the systems comprising at least certain apparatuses or devices described herein. Certain embodiments of such methods include blasting the exterior surface a first occurrence (one instance) for a first duration at a first velocity using blasting media. Thereafter, the exterior surface is blasted a second occurrence for a second duration at a second velocity using blasting media after blasting the exterior surface for a first duration, where the second velocity is lower than the first velocity. After blasting, the vehicle wheel is further cleaned using vibratory finishing techniques. In doing so, the vehicle wheel is arranged in contact with vibratory finishing media and vibrated with the vibratory finishing media for a duration, whereby the contact and rolling of the media along the surface of the wheel buffs and smooths the wheel surface profile. In doing so, the wheel and media move and shift within a vessel. In particular instances, the vibratory finishing is a vibratory high impact finishing process, which in taking into account the type of vibratory finishing media employed together with a particular frequency of the vibratory input imparts notable impact between the vibratory finishing media and the wheel. In any event, as a result, the exterior surface of the wheel better resists corrosion and/or oxidation that may arise without the need to polish the aluminum wheel thereafter.

It is appreciated that any blasting mechanism, which is more generally referred to as a blaster, may use any blast media suitable for cleaning an aluminum wheel so as to not notably damage the aluminum wheel and not remove any notable amount of material forming the wheel. For example, in certain embodiments, a centrifugal blaster is employed, which uses rotary wheels or paddles that engage blast media directed into contact with the rotary member, which then directs the blast media towards the aluminum wheel at a particular velocity. In other embodiments, blasting is performed using an air blaster. A spray blaster uses pressurized fluid, such as pressurized air or gas, to shoot particulate blasting media mixed with the pressurized fluid towards the aluminum wheel at a particular velocity, such as by use of a spray nozzle or gun, which may be manually operated, for example. A centrifugal blaster generally drives blast media at a higher velocity than a spray blaster.

It has been determined that simply blasting the aluminum wheel at a speed sufficient to remove dirt and grime leaves the aluminum wheel exterior surface profile jagged and rough that cannot be sufficiently corrected by vibratory finishing, at least in a timely fashion. Therefore, for this reason, the aluminum wheel is blasted secondarily at a lower velocity so to improve (that is, reduce) the surface profile which promotes proper finishing and polishing at a later stage. For example, in certain instances, the second velocity is substantially 50% of the first velocity. Other relative variations may be employed, however, such as at least a 25% reduction. This difference in velocity may also be expressed as rotational speed or frequency. For example, where blasting is performed by a rotational blaster, such as a centrifugal blaster, the rotational blaster rotates at a first frequency for discharging blasting media at the first velocity and at a second frequency for discharging the blasting media at the second velocity, the second frequency being substantially less than the first frequency. Consistent with the speed ratios expressed above, in certain instances, the second frequency is substantially 50% of the first frequency. For example, the first frequency may be 60 hertz and the second frequency 30 hertz. Other variations may include blasting at a first frequency of 60 hertz and a second frequency of between 20 and 45 hertz, such as 40 hertz, for example.

It is appreciated that blasting may be performed for any of a variety of durations depending on the circumstances. In certain instances, the first duration is equal to or greater than the second duration or, in more particular instances, blasting during the first duration relative to the second duration is performed at substantially a 7:3 to a 1:1 ratio. In an exemplary embodiment, each of the first and second durations are substantially 2 minutes or up to 4 minutes in other variations. It is appreciated that each of the first and second durations may be parsed into multiple sequential steps. It is also appreciated that other blasting may occur between the first and second occurrences. In certain instances, the second blasting occurrence is the last blasting occurrence before vibratory finishing.

Testing was conducted on certain wheels and it was determined that blasting at a first duration at a first frequency (speed) and then at a second duration at a second frequency (speed), where the first frequency was greater than the second frequency, provided better and surprising results. For instance, in certain testing, it was observed that blasting at a first duration of 2 minutes at a first frequency of 60 hertz and a second duration of 2 minutes at a second frequency of 30 hertz provided better results than wheels blasted for 4 minutes at 60 hertz. In other testing, it was observed that blasting at a first frequency did not sufficiently clean the aluminum wheels, such as the wheel flange area, at or below 30 to 40 hertz.

To better understand the immediate benefits of blasting first at a higher frequency and then again at a lower frequency, wheels were evaluated prior to and after blasting. In this series of tests, wheels were evaluated by measuring the surface profile (roughness) using a profilometer. Four (4) comparisons were conducted, where a first wheel was blasted for 4 minutes at 60 hertz and a second wheel was blasted for 2 minutes at 60 hertz and a subsequent 2 minutes at 30 hertz. In each comparison, the same blasting media was used on each pair of wheels, even though between the four comparisons conducted, different blasting media was employed, allowing a true comparison in blasting performance between the pair of wheels within each of the four comparison tests conducted. On average, the wheels blasted first at higher then subsequently at a lower frequency had surface profiles (roughness) much lower than those blasted for 4 minutes at a higher frequency. Of particular note, those blasted at the higher and lower frequencies saw on average a 23% increase in surface profile while those blasted for the 4 full minutes at the higher frequency observed a 42% increase in surface profile. This was a surprising result, as no such difference was anticipated. It also appeared this difference impacted further cleaning and polishing, resulting in a much shinier (higher gloss) aluminum wheels.

In additional testing on different wheels, all the aluminum wheels were washed in the same manner prior to blasting, and thereafter all underwent the same blasting, vibratory finishing, and polishing processes with the exception that certain wheels were blasted 2 minutes each at 60 hertz and the 2 minutes at 30 hertz and certain wheels for 2 minutes at 60 hertz but while adding 2 minutes to the vibratory finishing process to see if adding the lost 2 minutes of blasting at the lower frequency could be made up in vibratory finishing. In the end, it was surprising the wheels blasted in two stages, first at a higher frequency and then subsequently at a lower frequency, generated more highly polished wheels as measured at the end of polishing by a glossmeter, which measures the reflectivity or reflective gloss of a surface. For wheels of similar condition (of similar glossiness) after having been washed, that is, those having had an average gloss value of between 24 and 39 gloss units, the multi-stage blasted wheels attained on average a 485% improvement (increase) in gloss in comparison to a 284% improvement in gloss for those blasted at 2 minutes with an additional 2 minutes added to the vibratory finishing process.

To assist in achieving the desired results, particular blast media is employed. In certain instances, the blast media employed is formed of a metal or metal alloy having a density of substantially 2.5 g/cc (grams per cubic centimeter) to 4 g/cc and/or a Knoop hardness of 25 to 110 or 90 to 105, as formed. For example, in instances, the blast media is formed of aluminum alloy 319 or 2N (99% pure aluminum) or of zinc/aluminum alloy ZA4 or HG. The blast media shape may be rounded, which includes spheres and teardrop shaped forms. The blast media size may be 300 to 600 microns (0.0118" to 0.0236") or 400 to 500 microns (0.0157" to 0.0197"). Alternative blast media includes cut zinc, alumina shot, and aluminum oxide shot, with alumina having a typical hardness of substantially 3.4 Mohs and aluminum oxide having a typical hardness of substantially 9 Mohs. In other variations, the size of the blast media may be of any size suitable for cleaning an aluminum wheel so to not notably damage the aluminum wheel and not remove any notable amount of material forming the wheel when employed by a particular blaster. In certain variations, the blasting media is softer than the aluminum wheel being cleaned, which may be 2.8 Mohs when formed of 6061 T6 aluminum, in accordance with one example.

In particular embodiments, when the blast media particulate is cut zinc, the blasting media is on average 0.019 inches (in.) in diameter. In other embodiments, when the blast media particulate is aluminum oxide, the blasting media is a grit size of 36 (0.120 to 0.300 inches (in.)), 46 (0.0095 to 0.0220 in.), or 60 (0.0065 to 0.0160 in.), or stated differently, a grit size of 36 to 60. It is appreciated, or each material, other sizes may be employed.

In other exemplary embodiments, the blast media is a mixture substantially comprising, by weight: substantially 94.5% or less aluminum; 9.4% or less silicon; 1.0% or less copper; 1.0% or less zinc; and 1.1% or less other particulate.

Prior to or after blasting, a wire brush may be employed to clean the bead area of the wheel, which may include an excessive buildup of rubber, oxidation, or tire lube. The wire brush may be manually or mechanically employed.

In performing the vibratory finishing, the wheel with the vibratory finishing media and liquid detergent, when present, is arranged in a vessel, such as a tank or vat. The vibratory finishing media may comprise any desired form of vibratory finishing media, such as, in certain exemplary embodiments, particulate having a density of 2 to 4 g/cc and/or a Knoop hardness of 400 to 800. The media is generally rounded in certain instances. For example, rounded ceramic beads may be employed. By further example, the rounded ceramic beads are made of porcelain. Porcelain has a density of 2.3 to 3 g/cc and a Knoop hardness of 600. Moreover, in certain instances, the porcelain is provided in spheres having an outside diameter of substantially 6 mm, although other sizes may be employed. In other exemplary instances, the vibratory finishing media is a mixture comprising, by weight: 70-80% aluminum oxide; 10-20% silica; 10% or less feldspar; 5% or less magnesium oxide; and 5% or less bentonite. Vibratory finishing maybe performed at any if a variety of frequencies suitable to achieve the desired purpose. For example, in certain instances in vibrating, a vibratory input of substantially 1350 rpm (22.5 hertz) is applied, such as by way of a 20 horsepower (hp) motor, to perform vibratory high impact finishing, but may form other frequencies, including a range from 1000 to 1700 rpm (16.6 to 28.3 hertz), by way of different horsepower motors, such as 15 to 25 hp for example. In such instances, the vibratory finishing operation may endure for 5 to 25 minutes, or in certain instances substantially 10 to 15 minutes. In certain embodiments, the vibratory finishing media does not include forms made of plastic, metallics, and dry materials, such as wood pegs and erasers. As noted, a liquid detergent composition, which may be diluted in water, may be employed with the vibratory finishing media. The detergent may be any known vibratory finishing detergent, such as detergent that may be employed with porcelain vibratory finishing media. By example, in certain embodiments, the liquid detergent is a mixture comprising, by weight: 5-10% 1,2,3-propanetricaboxylic acid, 2-hydroxy; 1-5% glycine, N,N'-1,2-ethanediylbis[N—(carboxymethyl)-, sodium salt (1:4); and 1-5% surfactant.

In lieu of using vibratory finishing or in lieu of blasting at the second velocity, the exterior surface of the aluminum wheel is blasted at a reduced velocity with ceramic or glass blast media (beads or shot). In certain exemplary instances, a glass bead shot blast media of size "B" is employed, where size "B" corresponds to a U.S. standard screen size of 30-40. In other exemplary instances, a glass bead blast media of size "AE" is employed, where size "AE" corresponds to a U.S. standard screen size of 100-170. Glass beads can be characterized as having a typical hardness of substantially 5.5 Mohs. While any blast media suitable for lowering the profile (that is, the surface roughness) of the aluminum wheel, in certain instances, the blast media employed for polishing has a hardness and/or density greater than the blast media employed for prior steps of blasting.

Prior to blasting, the exterior surface of the wheel may be optionally washed using any desired liquid or solution. It is also appreciated any desired detergent and/or degreaser may be employed, either as part of the solution or which may itself be directly applied to the wheel. In certain exemplary embodiments, the detergent is a mixture comprising, by weight: 80-90% water; 1-5% alcohols, C10-16, ethoxylated propoxylated; 1-5% N,N-didecyl-N,N-dimethylammonium bicarbonate and N,N-didecyle-N,N-dimethylammonium carbonate; 1-5% alcohol ethoxylate; 0.1-1% sodium metasilicate; 0.1-1% tetradodium EDTA; and 0.1-1% sodium citrate dihydrate. Any of the forgoing may be applied at room temperature or in a heated state. In an exemplary embodiment, the liquid is water, which is heated and includes a detergent and/or degreaser to improve the initial cleaning of the wheel. Thereafter, the wheel may optionally be dried to improve the efficiency of blasting.

After the wheel has been cleaned, that is, after vibratory finishing, it may be further treated. For example, a protective coating may be applied to the exterior surface. For example, application of a coating to the aluminum wheel may be achieved using an anodizing process. In other instances, the coating is a hydrophobic coating. In yet other instances, the coating is a powder coating, a clear coating, or a paint composition. A primer may also be employed prior to applying a paint composition. More generally, any combination of any one or more coatings may be applied. By further example, in lieu of a coating, a polishing agent may be applied to the exterior surface and subsequently polished. It is appreciated that polishing may be performed by hand manually or by use of a polishing machine, such as a rotational polisher, which may be operated manually or automatically. It is also appreciated the polishing agent may be any polishing composition or compound, or any combination thereof, that may be used to polish aluminum or any other like material. For example, the polishing agent may be any known or desired wax. By further example, the polishing agent may be a mixture comprising, by weight, 10-20% chromium (III) oxide, 10-20% tallow derivatives, 1-5% carnauba wax, and 50-60% petroleum derivatives.

In certain instances, when applying polishing agent to the wheel using a polishing machine, in performing a polishing step, it is appreciated that polishing may be performed in multiple steps, where a break in polishing is arranged between the separate polishing steps. It has been learned that taking a break or pausing polishing generates notably better results, by allowing the wheel to cool. For example, a polishing operation (or cycle) for a wheel includes a first step that endures for a first duration, such as for 1 to 2 minutes, by example, after which the polishing operation pauses for at least a short duration, such as 10 to 30 seconds, for example, and thereafter, the polishing operation resumes for a second step for a second duration, such as for an additional 1 to 3 minutes, by example. Additional polishing steps in the polishing operation maybe employed with breaks or pauses therebetween. During any such break or pause in the polishing operation, additional polishing agent may be applied to the wheel, either directly or through an applicator of the polishing machine (where an applicator may be a polishing head, as discussed herein), or otherwise may be applied to the wheel during the subsequent step in the polishing operation following the pause or break. In one example, a polishing operation includes a first step that endures for 1 minute, followed by a pause in the polishing operation for 10 to 30 seconds, and thereafter the polishing operation resumes in a second step that endures for 2 minutes.

In addition to, or in lieu of, including any break or pause in the polishing operation, the wheel may be cooled during the polishing operation. This provides cooling benefits that have been observed to improve polishing. Any cooling mechanism or operation may be employed to direct cool air or gas at the wheel and/or polishing head, or to provide a cool atmosphere or environment in which the polishing takes place. For example, a cabinet cooler may be employed to direct a flow of cool air or gas at the wheel and/or polishing head during polishing, where such cabinet cooler may employ a vortex tube or the like, for example. A flow of cool gas may be obtained from any other desired cooling source, such as an air conditioner or employing refrigerant or other cooling mechanisms. By further example, polishing may be performed within an area in which the temperature is controlled to provide an atmosphere sufficient to cool the wheel during polishing, such as by use of an air conditioner or any other desired cooling source employing refrigerant or other cooling mechanisms. The amount of cooling required may vary depending upon the circumstances, but in certain instances, a 15 degree different between the cooling air or gas and normal atmospheric conditions is employed.

Optionally, during the second step of polishing, relative rotation between the wheel and the polishing applicator (such as the polishing head) is reversed from relative rotation direction used in the first step of polishing. Further, in any embodiment of polishing, when applying engaging contact between the wheel and the polishing heads (applicators), such contact may initially occur at an elevated force or pressure, which is subsequently reduced for polishing. The purpose of the initial relative high pressure is to deflect the resilient heads (which may be formed of foam, sponge, etc.) while releasing or retracting the heads slightly to in effect reduce the force or pressure allows the resilient heads to expand and better conform to the shape of the wheel for improved polishing.

The foregoing and other embodiments, objects, features, and advantages will be apparent from the following more detailed descriptions of particular embodiments, as illustrated in the accompanying drawings wherein like reference numbers represent like parts.

DETAILED DESCRIPTION

Embodiments comprise a method of cleaning an aluminum wheel. Particular embodiments are now discussed in association with the figures identified above.

Figure 1:
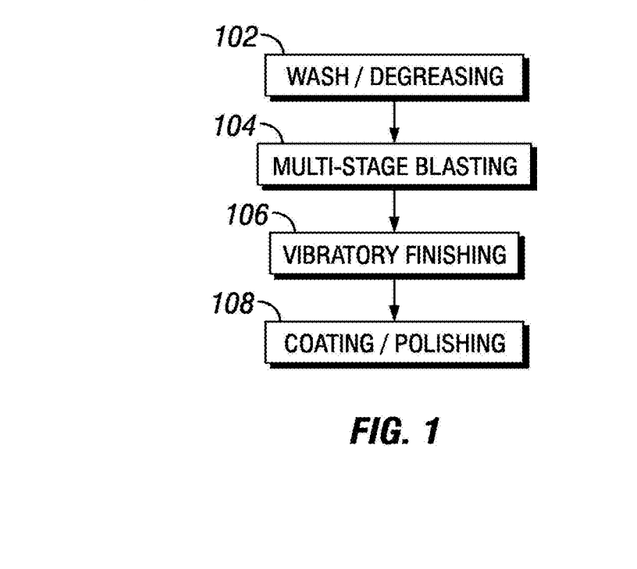
FIG. 1 is a flow chart showing an aluminum vehicle wheel cleaning process, according to a particular embodiment.
Figure 2:
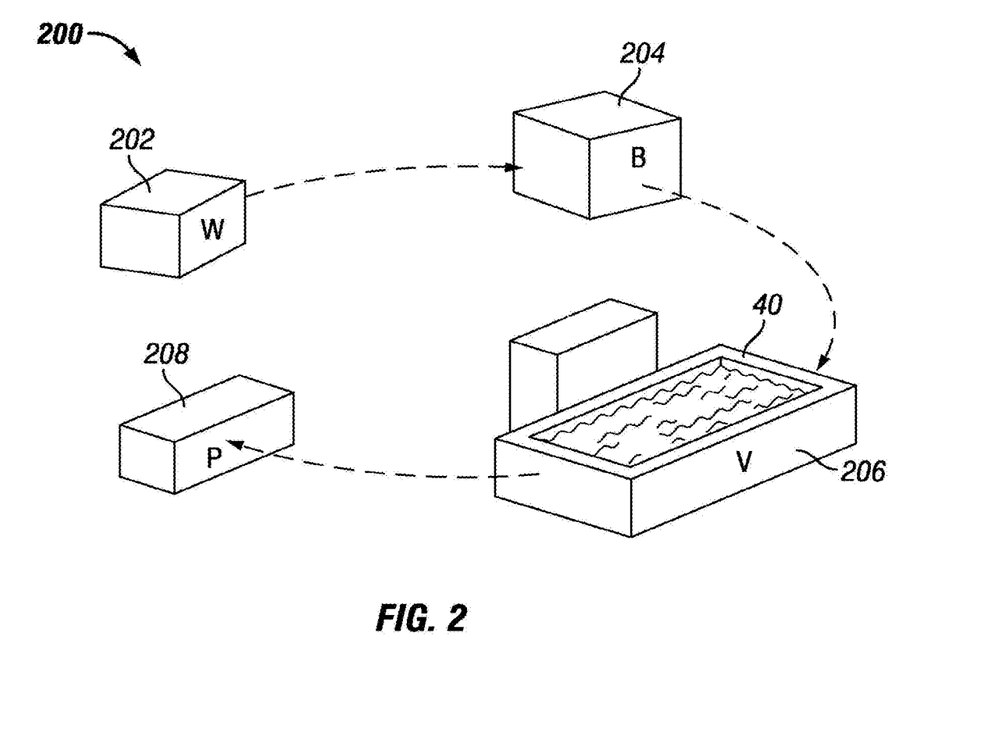
FIG. 2 shows a system for cleaning aluminum vehicle wheels according to the process of FIG. 1.

With reference to FIG. 1, a flow chart is shown describing an aluminum vehicle wheel cleaning process 100 according to a particular embodiment. Initially, an optional step of washing and/or degreasing is shown as 102 prior to blasting the wheel using a multi-stage blasting process 104 in accordance with any of the various embodiments described herein. After blasting, the wheel undergoes a vibratory finishing process 106, and thereafter, an optional step 108 of polishing the wheel or applying a protective coating is performed. With reference to FIG. 2, a corresponding system 200 is shown for performing the vehicle wheel cleaning process 100, the system comprising an optional washing unit 202 for performing the washing and/or degreasing step 102 in accordance with any variation thereof described or contemplated herein, a blasting unit 204 for performing the multi-stage blasting process 104 in accordance with any variation thereof described or contemplated herein, a vibratory finishing unit 206 for performing the vibratory finishing step 106 in accordance with any variation thereof described or contemplated herein, and an optional polishing unit 208 for performing the polishing step 108 in accordance with any variation thereof described or contemplated herein. It is appreciated that, for performing any such step or process, one or more corresponding units 202 through 208 may be employed. Each such unit may include any and all features needed or useful for performing any corresponding process or step 102 through 108.

Figure 3:
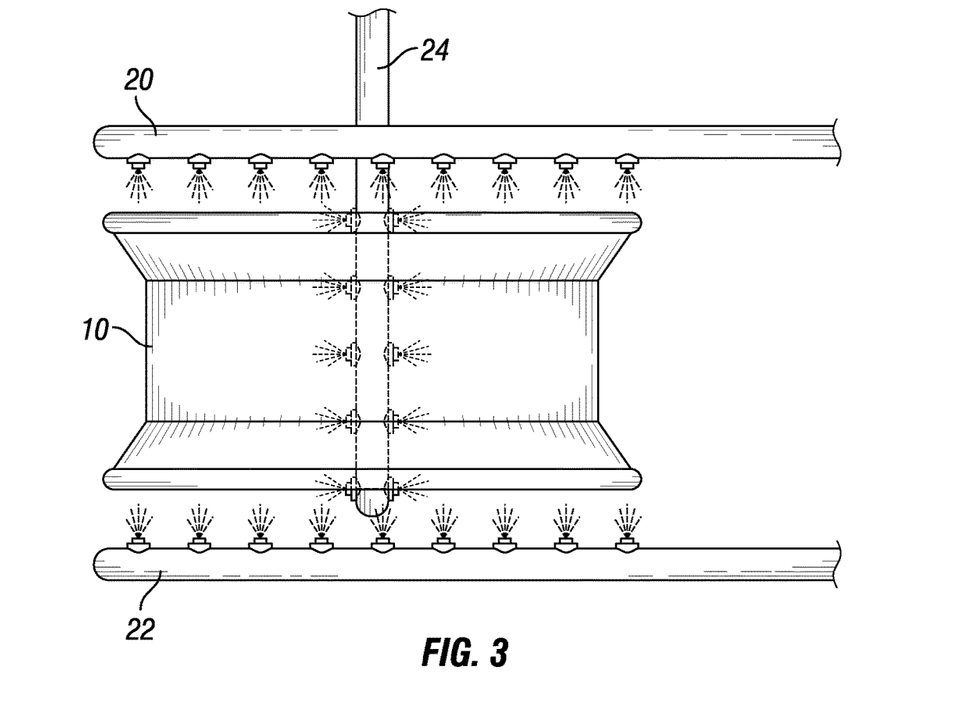
FIG. 3 is a side elevational view of an aluminum vehicle wheel undergoing a washing process, according to a particular embodiment.

With reference to FIG. 3, a side elevational view of an aluminum vehicle wheel 10 undergoing an optional washing process (102) is shown, according to a particular embodiment. As stated previously, the washing process (102) is used in certain instances to remove dirt, debris, and any grease prior to blasting, making the blasting process more efficient and effective. It is appreciated that any known washing process may be employed using any known device or devices, such as washing unit 202. In the example shown, wash spray ports 20 are arranged along a top side of the wheel 10, spray ports 22 are arranged along a bottom side of the wheel 10, and spray ports 24 are arranged centrally within wheel 10 so to sufficiently wash the wheel as desired. Through such spray ports, any washing liquid may be employed. For example, water with or without any detergent may be used, which may or may not be heated. In certain instances the detergent is a mixture comprising, by weight: 80-90% water; 1-5% alcohols, C10-16, ethoxylated propoxylated; 1-5% N,N-didecyl-N,N-dimethylammonium bicarbonate and N,N-didecyle-N,N-dimethylammonium carbonate; 1-5% alcohol ethoxylate; 0.1-1% sodium metasilicate; 0.1-1% tetradodium EDTA; and 0.1-1% sodium citrate dihydrate. A degreaser may also be used as part of the washing process. In lieu of using a spray washing system, another option is to submerge the wheel in a washing liquid, with or without agitation. A rinsing and/or drying step may follow prior to blasting. The washing process may be performed manually or by using a single washing machine or unit or multiple washing machines or units (that is, one or more apparatuses or devices). In certain embodiments, all spray ports 20, 22, 24 are contained in a single machine or unit, such as unit 202, for example.

Washing units, such as unit 202, may vent steam, vapor, or other saturated gas out of the unit through a vent or discharge. A washing unit may employ a condenser to recover water and detergent otherwise discharged in the form of steam, vapor, or saturated gas into the environment or facility. Also, by employing a condenser, the need to port the vented steam outside a facility is avoided. The condenser is fluidly attached to the steam vent or discharge of the washer. In a particular embodiment shown in FIGS. 10-13, a condenser 26 is attached to a steam vent 25 of a washer 202. Condenser 26 includes a plurality of condensing chambers 27 arranged along the length of a conduit or pipe 28. Stated differently, a conduit or pipe 28 is arranged between and fluidly connects a plurality of spaced-apart condensing chambers 27. Each chamber 27 includes one or more hollow condensation tubes 29 extending across a corresponding condensing chamber 27, where gas enters and passes through each such tube. This gas may be ambient air, or cooled air or other gas. By doing so, with the gas being cooler than the steam contained within the corresponding condensing chamber 27, the tube 29 is cooler than the steam and corresponding cools the surrounding steam within the chamber, causing the steam to condense, and the resulting water with detergent is recovered and reused by the washer. Each chamber has at least one of a floor 27A and ceiling 27B, such as in the form of a plate, and in certain embodiments a chamber has both a floor and ceiling. Any such chamber floor 27A and ceiling 27B may include one or more openings 27C of any desired shape that in total provide a pass-through void area that is smaller than the cross-sectional area (based on the internal dimensions) of the conduit or pipe 27. In the embodiment shown, the opening is "C" or crescent shaped. These openings 27C may be off-set or misaligned between adjacent floors 27A and ceilings 27B within each chamber 27 and between chambers 27 to further restrict the flow of steam. By providing the one or more openings 27C, flow is restricted causing steam to remain longer in each condensing chamber. Heat is also better retained and prevented from escaping. A chamber floor 27A may be corrugated or otherwise grooved and/or may be sloped to permit the condensed water to flow back down the condenser and into the washer for recovery. Condenser 26 may be formed of aluminum or any suitable material(s). In the embodiment shown, condenser 26 operates without the need for electricity or any other power source.

Figure 4:
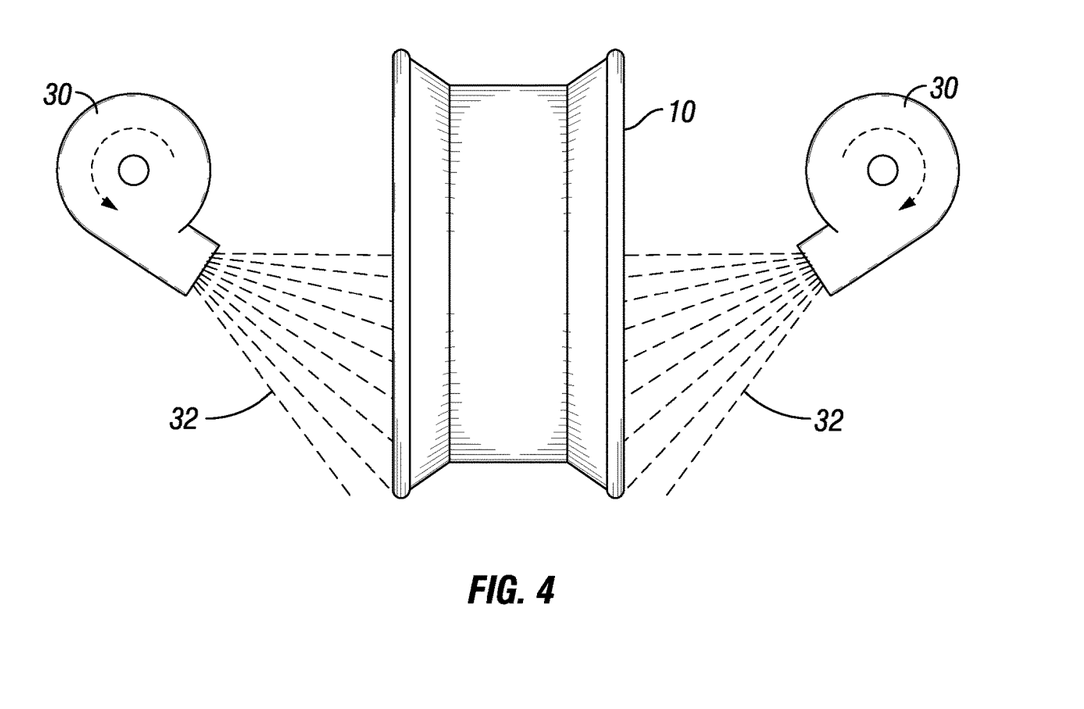
FIG. 4 is a side elevational view of an aluminum vehicle wheel undergoing a blast process using centrifugal blasters, according to a particular embodiment.

With reference to FIG. 4, a side elevational view of an aluminum vehicle wheel 10 undergoing a multi-stage blast process (104) is shown using centrifugal blasters 30 according to a particular embodiment. In the embodiment, a pair of centrifugal blasters 30 direct blast media 32 at opposing sides of the wheel. It is appreciated that any blaster may be employed, as suggested previously. The blasting process may be performed using a single machine or unit 204 or multiple machines or units 204 (that is, one or more apparatuses or devices). Any such an apparatus or device 204 may be referred to as a wheel blasting machine. In certain embodiments, both blasters 30 are contained in a single machine or unit 204. However, regardless of the blaster employed, a multi-stage blasting process is performed, where one or multiple blasting steps are performed at a higher velocity (a first velocity) and then, subsequently, as a lower velocity (a second velocity). There is at least a 15% to 50% difference (as measured relative to the highest velocity) between the higher and lower velocities. It is appreciated that the blasting occurring at a higher velocity may be performed at a variety of different speeds within an elevated range of velocities. Likewise, the blasting that occurs at a lower velocity may be performed at a variety of different speeds within a reduced range of velocities. However, in such instances, there is a substantial difference between the elevated range and the reduced range of velocities—such as at least a 15% to 50% difference. Stated differently, there is at least a 15% to 50% difference (as measured relative to the highest velocity) between the lowest velocity in the elevated range and the highest velocity of the reduced range.

As noted previously, in particular embodiments, the blast media employed may be formed of a metal or metal alloy having a density of substantially 2.5 g/cc (grams per cubic centimeter) to 4 g/cc and/or a Knoop hardness of 25 to 110 or 90 to 105, as formed. For example, in instances, the blast media is formed of aluminum alloy 319 or 2N (99% pure aluminum) or of zinc/aluminum alloy ZA4 or HG. In other instances, the blast media may be a mixture comprising, by weight, substantially 94.5% or less aluminum, 9.4% or less silicon, 1.0% or less copper, 1.0% or less zinc, and 1.1% or less other particulate. The blast media shape may be rounded, which includes spheres and teardrop shaped forms. The blast media size may be 300 to 600 microns or 400 to 500 microns. Alternative blast media includes cut zinc, aluminum oxide shot, alumina shot, which has a typical hardness of substantially 3.4 Mohs.

Figure 5:
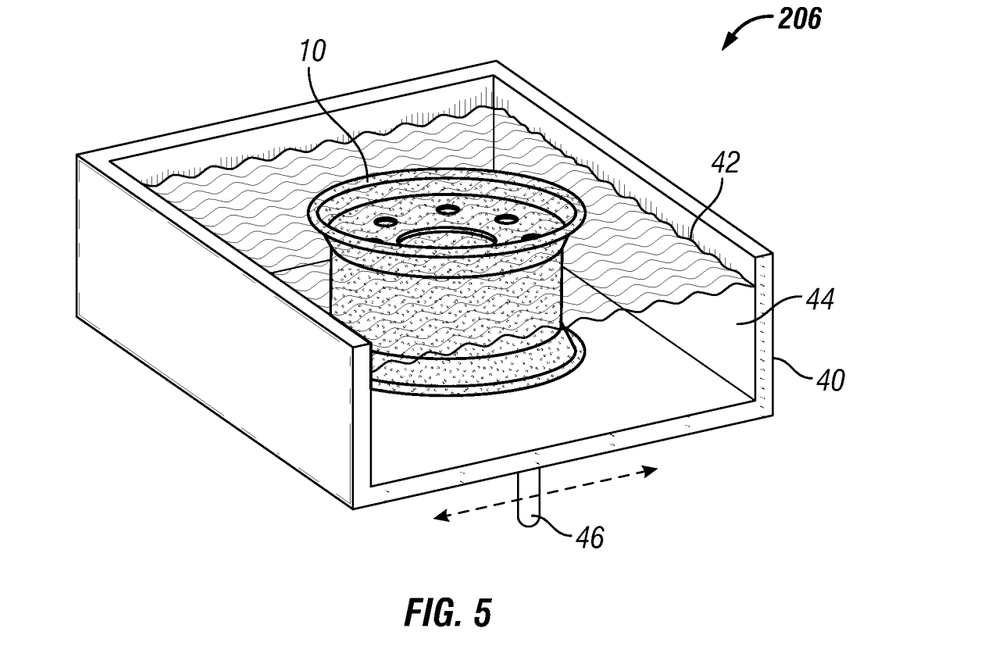
FIG. 5 is a side elevational view of a vibratory finishing process in which an aluminum vehicle wheel is arranged in a vessel containing vibratory finishing media and liquid detergent, according to a particular embodiment.

With regard to FIG. 5, a side elevational view of a vibratory finishing or process (106) is shown, in association with a vibratory finishing unit 206 (shown in FIG. 2), in which an aluminum vehicle wheel 10 is arranged in a vessel 40 containing vibratory finishing media 42 and optional liquid detergent 44, according to a particular embodiment. A vibratory input 46 is introduced to cause the vessel 40 and its contents to repeatedly shift back and forth to induce an impact and frictional interaction between the vibratory finishing media 42 and wheel 10. The detergent 44 is also agitated and caused to move around the wheel 10. This vibratory input may be generated by any means known or appreciated by one of ordinary skill, such as, for example, by use of a motor or the like and using a non-concentric connection or other linkage to create the vibratory (oscillating) input. The vibratory input may vary depending upon the contents, but in certain instances, 22.5 hertz input 46 (or more generally 16.6 to 28.3 hertz) is provided, such as when the vibratory finishing media 42 forms particulate having a density of 2 to 4 g/cc and/or a Knoop hardness of 400 to 800 or, in particular instances, particulate forming porcelain beads, such as may be sized 4 to 8 mm in diameter. In another exemplary instance, the vibratory finishing media 42 may be a mixture comprising, by weight: 70-80% aluminum oxide; 10-20% silica; 10% or less feldspar; 5% or less magnesium oxide; and 5% or less bentonite. The liquid detergent 44 may comprise any detergent contemplated herein, which includes, in an exemplary embodiment, a mixture comprising, by weight: 5-10% 1,2,3-propanetricaboxylic acid, 2-hydroxy; 1-5% glycine, N,N'-1,2-ethanediylbis[N—(carboxymethyl)-, sodium salt (1:4); and 1-5% surfactant. In such instances, the vibratory finishing process may be referred to as vibratory high impact finishing. Other means of performing vibratory finishing may be employed in other embodiments. Vessel 40 and any mechanism for generating the vibratory input 46, which may comprise a motor or any other known source, may be referred to as a vibratory finishing machine or unit 206 (that is, a vibratory finishing apparatus or device).

Figure 6:
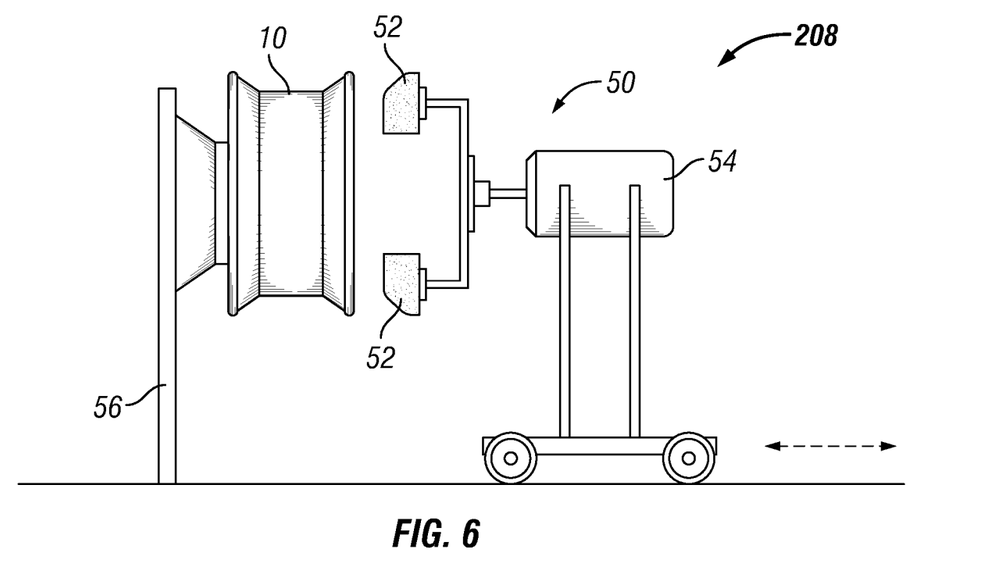
FIG. 6 is a side elevational view showing an aluminum vehicle wheel arranged for undergoing a polishing process using a rotational polisher, according to a particular embodiment.

With reference to FIG. 6, a side elevational view showing an aluminum vehicle wheel 10 arranged for a polishing process (see 108 in FIG. 1) using a rotational polisher 50 according to a particular embodiment, which forms a polishing unit 208 shown in the system shown in FIG. 2. In the embodiment shown, the rotational polisher 50 includes a rotating head 52 having an exterior surface formed of a polishing material for engaging and polishing the exterior surface of the wheel. The exterior surface of the head 52 may be formed of any desirous material, such as fabric, foam, or abrasive-coated material, for example. When using foam or any other deflecting (flexible or deformable) material, such as a sponge, the head is a resilient head that is adaptable to the shape of the wheel for improved polishing. A polishing agent forming any desired polishing composition may be used with the polisher 50 for polishing, such as any contemplated herein, where such polishing agent may be applied directly to the wheel or to the polishing head 52. A motor 54 for rotating the head 52 and a fixture 56 for retaining wheel 10 are also shown. One or more cooling sources 58 may also be included to perform the cooling functions described herein as part of the wheel polishing process, where cool gas is directed at the wheel 10 and/or any polishing head 52 or where the environment or gas surrounding the wheel 10 and/or any polishing head 52 is cooled. Any cooling source or mechanism may be employed. For example, the cooling source may form a cabinet cooler or vortex tube or an air conditioner using a refrigerant, such as any HydroFluoroCarbon (HFC), HydroChloroFluoroCarbon (HCFC), ChloroFluoroCarbon (CFC), Hydrocarbons, or HydroFluoroOlefin (HFO). The cooling source 58 may direct a flow of cooled air directly at the wheel generally or at certain portions of the wheel, such as by use of one or more hoses. The polisher 50 may translate, such as along a track with wheels or by any other means. It is appreciated that in lieu of heads 52 rotating and/or the translating with the rotational polisher 50 relative to a stationary wheel 10, the wheel 10 may be mounted such as to rotate and/or translate relative to heads 52. The polishing agent may be any contemplated herein.

Figure 7:
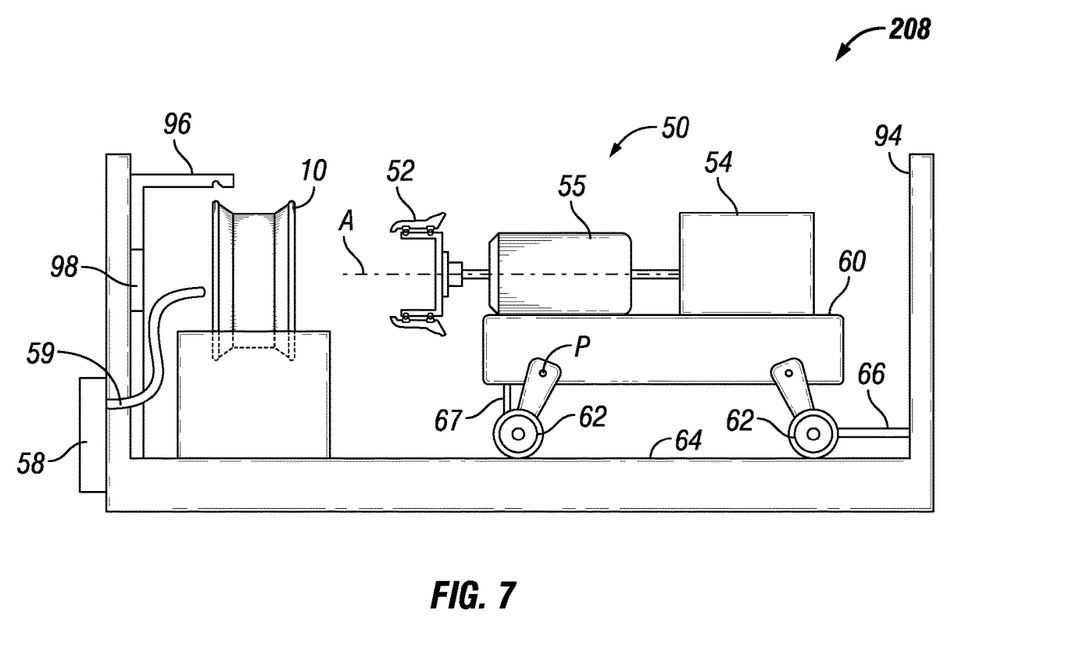
FIG. 7 is a side elevational view showing a polishing unit for practicing a polishing process of FIG. 6, according to a particular embodiment.

With regard to FIG. 7, another exemplary polishing unit 208 is shown configured for performing wheel polishing processes contemplated herein. The polishing unit 208 includes a polisher 50 surrounded by an outer frame unit 94 creating a self-contained polishing unit. Polisher 50 includes a polishing head 52 driven by a motor 54 and rotationally connected to the motor 54 by way of an optional gear box (transmission) 55. The polishing head 52, motor 54, and optional gear box 55 are attached to a chassis 60. The chassis 60 includes a translation means or mechanism comprising a plurality of wheels 62 configured to roll along a track 64. A cylinder 66 is used to drive the chassis along the track between polishing and withdrawn positions. Cylinder 66 may be any extendable cylinder or actuator, such as any hydraulic, pneumatic, or electric variety. In lieu of the wheel, track, and cylinder means of translation, any other means of translation may be employed. For example, use of rollers or a slide surface may be employed with any drive means or mechanism or an annular conveyor belt system may instead be employed, each of which may be driven by one or more cylinders, motor or the like. In any event, any translation means may be operated manually or automatically. An extendable wheel clamp 96 is shown, in an exemplary embodiment, using a cylinder or actuator 98 to extend clamp 96 up and down to receive and secure a wheel 10 within the unit 208. Any other means or mechanism for securing the wheel may be employed in other embodiments.

With continued reference to FIG. 7, as a means or mechanism for allowing the polishing head 52 to self-align vertically within any wheel 10 for polishing is employed, such means or mechanism comprising one or more cylinders or springs 67 are arranged directly or indirectly between the wheels 62 and the chassis 60, where the wheels 62 are pivotably connected to the chassis 60, such as by use of stricture attached to the chassis at location P. By doing so, the cylinders or springs 67 are able to vertically adjust the height of the chassis 60 and thereby the head 52 as the head is positioned against the wheel. While it is appreciated that a compressible cylinder or springs 67 (e.g., coil springs) allow the head height to automatically adjust as the head is pressed against the wheel, it is contemplated that cylinder/spring 67 or other manual means may be employed to manually adjust the height of head 52.

As discussed herein, cooling a wheel during its polishing has been determined to improve polishing performance. Accordingly, with reference to FIG. 7, a cooling source 58 is provided with polishing unit 208. Cooling source 58 may be any such source described herein, which may cool the atmosphere surrounding the wheel 10 or may be a flow of cooled fluid (air or other gas(es)) directed at the wheel at one or more locations. In this embodiment, discharge tubes 59 are shown directing flow at the wheel 10.

Figure 8:
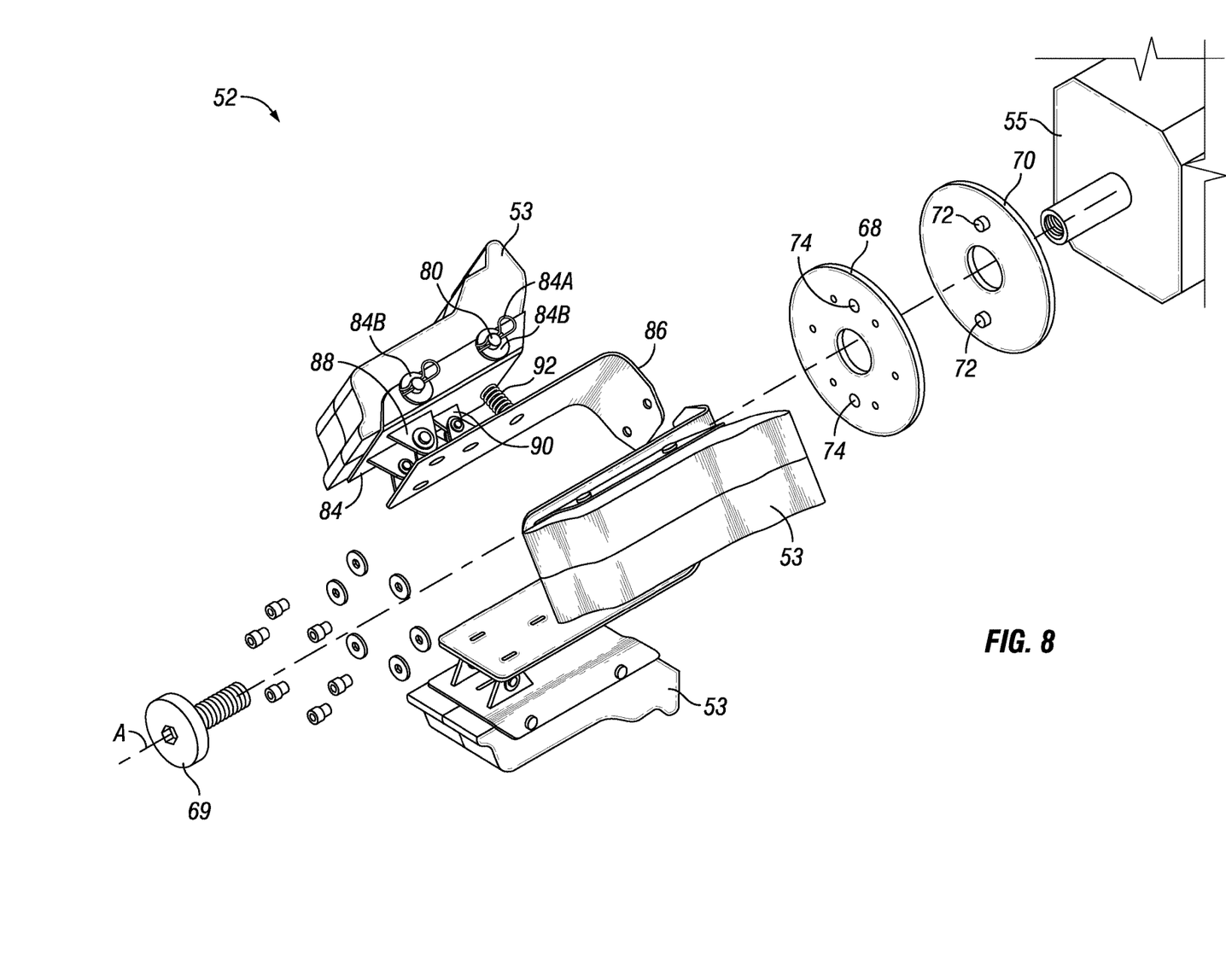
FIG. 8 is a perspective view of a polishing head unit of the polishing unit shown in FIG. 7.

With reference to FIG. 8, head 52 is shown in greater detail. In the embodiment shown, head 52 includes multiple polishing shoes 53 attached to a central hub 68. These shoes 53 form the exterior surface of head 52 elsewhere herein. In the embodiment shown, head 52 includes three (3) shoes each extending less than 360 degrees about a central rotational axis A of head 52. It is appreciated in other embodiments that a single shoe 53 may be employed, extending 360 degrees or less about rotational axis A. In other embodiments, two (2) or more shoes may be employed, each extending 360 degrees or less about rotational axis A. Central hub 68 is connected to an output shaft of the gear box 55, or of the motor 54 when no gear box is employed. In the embodiment shown, hub 68 is attached using a single fastener (a bolt or the like) 69 arranged within a central bore, with the hub 68 engaging an annular mounting member 70 forming a plate or disk in this example, such annular mounting member including self-aligning protrusions 72 for mating engagement with corresponding recesses or holes 74 arranged in hub 68. By virtue of this configuration, head 52 is able to be dismounted and remounted or replaced quickly and easily by removing the single fastener and self-aligning features, which may or may not be concurrently employed in any embodiment. It is also appreciated that in addition to or in lieu of the single, central fastener, one or more fasteners or other securing means may be employed to connect hub 68 to the annular mounting member 70.

Figure 9:
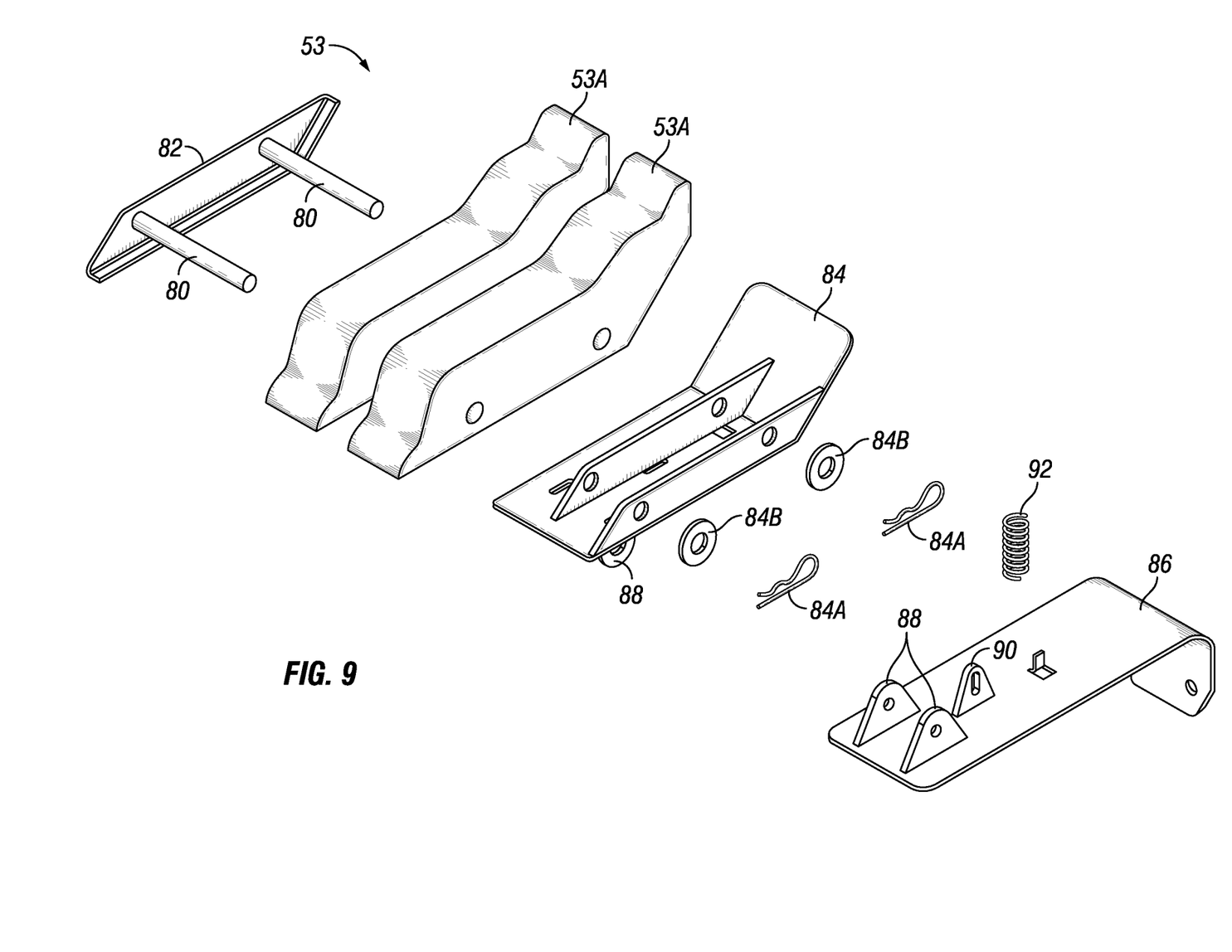
FIG. 9 is a perspective exploded view of a polishing head shown in FIG. 8, according to a particular embodiment.
Figure 10:
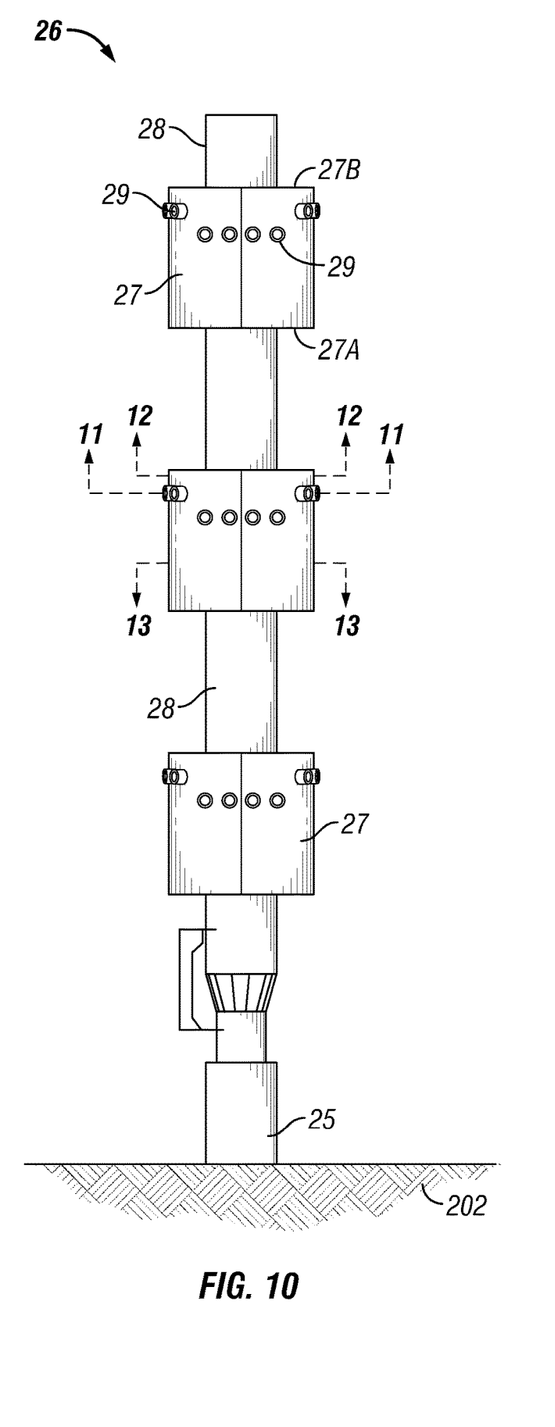
FIG. 10 is a side elevational view of a condenser for a washing unit, in accordance with a particular embodiment.
Figure 11:
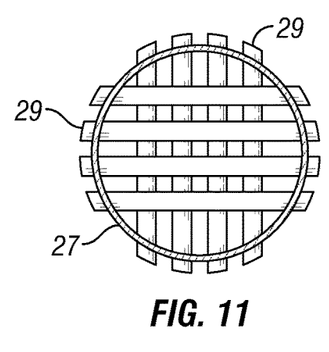
FIG. 11 is a sectional view taken along section 11-11 in FIG. 10.
Figure 12:
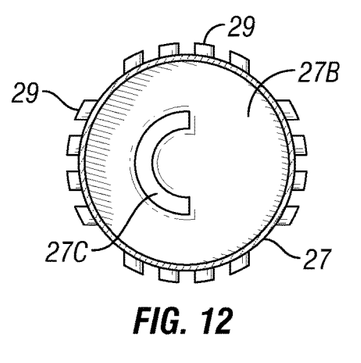
FIG. 12 is a sectional view taken along line 12-12 in FIG. 10.
Figure 13:
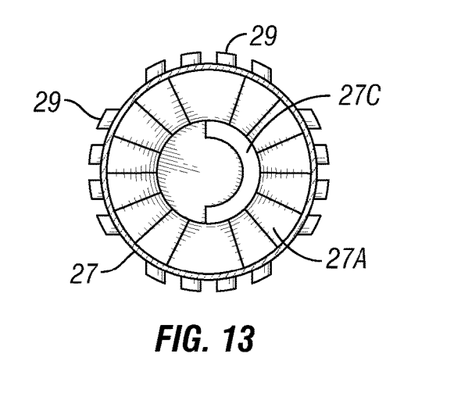
FIG. 13 is a sectional view taken along line 13-13 in FIG. 10.

With reference to FIG. 9, head 52 and each polishing shoe 53 is shown in greater detail. Each shoe 53 includes multiple polishing forms 53A. Each form 53A forms the exterior surface for engaging and polishing a wheel 10. In the embodiment shown, each form 53A is formed fully or at least partially of foam, sponge, or other deflectable material that is able to adapt to the shape of the wheel 10. It is contemplated that in any embodiment, each shoe 53 may include a single form 53A or two or more forms 53A. Shoes 53 are easily replaceable using one or more mounting pins 80 extending through each form 53A and a shoe mount 84, where is rod 80 extending from a side base member 82 is secured using a cotter pin 84A and washer 84B, although any other securing mechanisms may be employed in the alternative while retaining the quick disconnect feature.

With reference to FIGS. 8 and 9, shoes 53 are pivotable and sprung to permit self-alignment with a wheel 10 for polishing, which may be used with or without chassis cylinders or springs 66 discussed separately herein to achieve self-alignment of head 52 relative to any wheel 10 for polishing. In the embodiment shown, a pivot 88 is provided between shoe 53 and hub mount arm 86 for connecting shoe 53 to hub 68. Pivot 88 may comprise any pivotable connection, such as a hinged connection such as is shown, using one or more pins extending through a plurality of apertures arranged in corresponding structure associated with shoe 53 and shoe mount 84 or any intervening structure. To control the pivotability, a limiter 90 may be provided to limit the angular range of motion for pivot 88 and/or a spring 92 (e.g., a coil spring) or comparable structure, such as a compressible cylinder, actuator, or the like, may be employed to allow the shoe 53 to sufficiently press against the wheel 10 under force, yet permit compression of spring 92 as desired to permit sufficient alignment of head 52 along wheel 10. It is appreciated that each shoe 53 may employ one or more springs 92.

In certain embodiments, a method of treating an exterior surface of an aluminum vehicle wheel is provided, which comprises:

blasting the exterior surface a first occurrence for a first duration at a first velocity using blasting media;

blasting the exterior surface a second occurrence for a second duration at a second velocity using blasting media after blasting the exterior surface for a first duration, the second velocity being substantially lower than the first velocity; and, arranging the vehicle wheel in contact with vibratory finishing media and vibrating the vehicle wheel with the vibratory finishing media for a duration after blasting the exterior surface in each of the first and second occurrences.

In certain variations of such method, the blast media used to blast the exterior surface in the first and second instances is formed of zinc, a zinc alloy, or aluminum.

In certain variations of any proceeding method, alone or in combination, the blast media has a Knoop hardness of 25 to 110 as formed.

In certain variations of any proceeding method, alone or in combination, the blast media is substantially 300 to 700 microns in size.

In certain variations of any proceeding method, alone or in combination, the blast media is rounded or teardrop shaped.

In certain variations of any proceeding method, alone or in combination, the vibratory finishing media is formed of ceramic or of porcelain.

In certain variations of any proceeding method, alone or in combination, a liquid detergent is also arranged with the vibratory finishing media and vibrated with the vehicle wheel.

In certain variations of any proceeding method, alone or in combination, in vibrating, a vibratory input of substantially 16.6 to 28.3 hertz is applied.

In certain variations of any proceeding method, alone or in combination, blasting for the first duration and the second duration form is performed at a substantially 7:3 to a 1:1 ratio.

In certain variations of any proceeding method, alone or in combination, each of the first and second durations are substantially 2 minutes.

In certain variations of any proceeding method, alone or in combination, second velocity is substantially 50% of the first velocity.

In certain variations of any proceeding method, alone or in combination, blasting is performed by a rotational blaster, the rotational blaster rotating at a first frequency for discharging blast media at the first velocity and at a second frequency for discharging the blast media at the second velocity, the second frequency being substantially less than the first frequency. In certain variations of any proceeding method, alone or in combination, the second frequency is substantially 50% of the first frequency.

In certain variations of any proceeding method, alone or in combination, the method further includes washing at least the exterior surface of the wheel prior to blasting the exterior surface of the vehicle wheel for the first duration.

In certain variations of any proceeding method, alone or in combination, the method further includes applying a protective coating to the exterior surface after vibrating the vehicle wheel with vibratory finishing media.

In certain variations of any proceeding method, alone or in combination, the method further includes cooling the wheel and/or a polishing head of a polisher during polishing.

In certain variations of any proceeding method, alone or in combination, the method further includes polishing in multiple steps, where for each step, the wheel is polished and between each step, the polishing is temporarily stopped for up to 1 to 5 minutes, and where additional polishing agent is optionally applied before resuming polishing in a subsequent step.

In certain variations of any proceeding method, alone or in combination, the method further including applying a polishing agent to the exterior surface and polishing the exterior surface after vibrating the vehicle wheel with vibratory finishing media. In certain variations of any proceeding method, alone or in combination, the polishing is performed by a rotational buffer. These methods may be implemented using any system comprising the multiple apparatuses or devices described herein, where any portions of these methods may be implemented by way of any corresponding apparatus or device described herein.

In certain instances, a system configured to perform any of the methods described or contemplated herein is provided. In certain instances, such system includes: a blasting unit configured for blasting the exterior surface a first occurrence for a first duration at a first velocity using blasting media and for blasting the exterior surface a second occurrence for a second duration at a second velocity using blasting media after blasting the exterior surface for a first duration, the second velocity being substantially lower than the first velocity; and, a vibratory finishing unit configured for vibrating the vehicle wheel with vibratory finishing media for a duration after blasting the exterior surface in each of the first and second occurrences. In certain instances, the system further includes a polishing unit for polishing the exterior surface after vibrating the vehicle wheel with vibratory finishing media. In certain variations of any proceeding system, alone or in combination, the system further includes a washing unit configured for washing at least the exterior surface of the wheel prior to blasting the exterior surface of the vehicle wheel for the first duration. In certain variations of any proceeding system, alone or in combination, such system includes a condenser is fluidly connected to a gas vent, the condenser including one or more condensing chambers across which one or more condensing tubes extend, each of the one or more condensing chambers including a floor and a ceiling each having an opening smaller in cross-section than a conduit or pipe fluidly connected to one of the floor or ceiling. In certain variations of any proceeding system, alone or in combination, the polishing unit includes a polishing head for polishing the exterior surface, the polishing head including one or more shoes for engaging the exterior surface, where each of the one or more shoes are pivotable to provide self-aligning capabilities relative a wheel for polishing. In certain variations of any proceeding system, alone or in combination, the system includes any combination of features described or contemplated herein.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

The following is claimed:

1. A method of treating an exterior surface of an aluminum vehicle wheel comprising: blasting the exterior surface at a first occurrence for a first duration at a first velocity using blasting media; blasting the exterior surface at a second occurrence for a second duration at a second velocity using blasting media after blasting the exterior surface for the first duration, the second velocity being substantially lower than the first velocity; and, then arranging the vehicle wheel in contact with vibratory finishing media and vibrating the vehicle wheel with the vibratory finishing media for a third duration after blasting the exterior surface in each of the first and second occurrences, wherein the second velocity is at least 25% less than the first velocity.

2. The method of claim 1, wherein the blasting media used to blast the exterior surface in the first and second occurrences comprises zinc, a zinc alloy, or aluminum.

3. The method of claim 1, wherein the blasting media has a Knoop hardness of 25 to 110 as formed.

4. The method of claim 1, wherein the blasting media is substantially 300 to 700 microns in size.

5. The method of claim 1, wherein the blasting media is rounded or teardrop shaped.

6. The method of claim 1, wherein the vibratory finishing media comprises ceramic or of porcelain.

7. The method of claim 1, wherein a liquid detergent is also arranged with the vibratory finishing media and vibrated with the vehicle wheel.

8. The method of claim 1, wherein a vibratory input of substantially 16.6 to 28.3 hertz is applied during vibrating the wheel with the vibratory finishing media.

9. The method of claim 1, wherein blasting for the first duration and the second duration form is performed at a substantially 7:3 to a 1:1 duration of time ratio.

10. The method of claim 1, wherein each of the first and second durations are substantially 2 minutes.

11. The method of claim 1, wherein second velocity is substantially 50% of the first velocity.

12. The method of claim 1, wherein blasting is performed by a rotational blaster, the rotational blaster rotating at a first frequency for discharging blasting media at the first velocity and at a second frequency for discharging the blasting media at the second velocity, the second frequency being substantially less than the first frequency.

13. The method of claim 1, wherein the method further includes washing at least the exterior surface of the wheel prior to blasting the exterior surface of the vehicle wheel for the first duration.

14. The method of claim 1, wherein the method further includes applying a protective coating to the exterior surface after vibrating the vehicle wheel with vibratory finishing media.

15. The method of claim 1, wherein the method further including applying a polishing agent to the exterior surface and polishing the exterior surface after vibrating the vehicle wheel with vibratory finishing media.

16. The method of claim 15, wherein the wheel and/or a polishing head of a polisher is cooled during polishing.

17. The method of claim 15, wherein polishing is performed in multiple steps, wherein for each step, the wheel is polished and between each step, the polishing is temporarily stopped for up to 1 to 5 minutes, and wherein additional polishing agent is optionally applied before resuming polishing in a subsequent step.

18. A system configured to perform the method of claim 1, the system comprising: a blasting unit configured for blasting the exterior surface the first occurrence for the first duration at the first velocity using blasting media and for blasting the exterior surface the second occurrence for the second duration at the second velocity using blasting media after blasting the exterior surface for the first duration, the second velocity being substantially lower than the first velocity; and, a vibratory finishing unit configured for vibrating the vehicle wheel with vibratory finishing media for the third duration after blasting the exterior surface in each of the first and second occurrences.

19. The system of claim 18 further comprising: a polishing unit for polishing the exterior surface after vibrating the vehicle wheel with vibratory finishing media.

20. The system of claim 18 further comprising: a washing unit configured for washing at least the exterior surface of the wheel prior to blasting the exterior surface of the vehicle wheel for the first duration.

21. The system of claim 20, wherein a condenser is fluidly connected to a gas vent, the condenser including one or more condensing chambers across which one or more condensing tubes extend, each of the one or more condensing chambers including a floor and a ceiling each having an opening smaller in cross-section than a conduit or pipe fluidly connected to one of the floor or ceiling.

22. The system of claim 19, wherein the polishing unit includes a polishing head for polishing the exterior surface, the polishing head including one or more shoes for engaging the exterior surface, wherein each of the one or more shoes are pivotable to provide self- aligning capabilities relative a wheel for polishing.

* * * * *